Feb. 16, 1932.   E. H. LUNKEN   1,845,304
WINDOW CONSTRUCTION
Filed Sept. 9, 1929   6 Sheets-Sheet 1

INVENTOR.
Edmund H. Lunken
BY
ATTORNEY.

Feb. 16, 1932.     E. H. LUNKEN     1,845,304
WINDOW CONSTRUCTION
Filed Sept. 9, 1929     6 Sheets-Sheet 2

INVENTOR.
Edmund H. Lunken
BY
ATTORNEY.

Feb. 16, 1932.  E. H. LUNKEN  1,845,304
WINDOW CONSTRUCTION
Filed Sept. 9, 1929  6 Sheets-Sheet 3
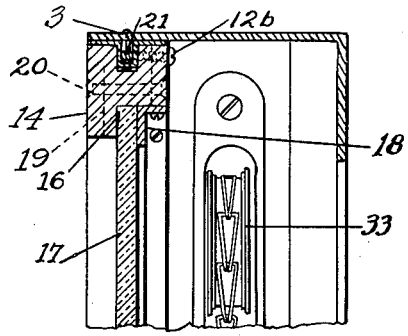
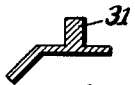
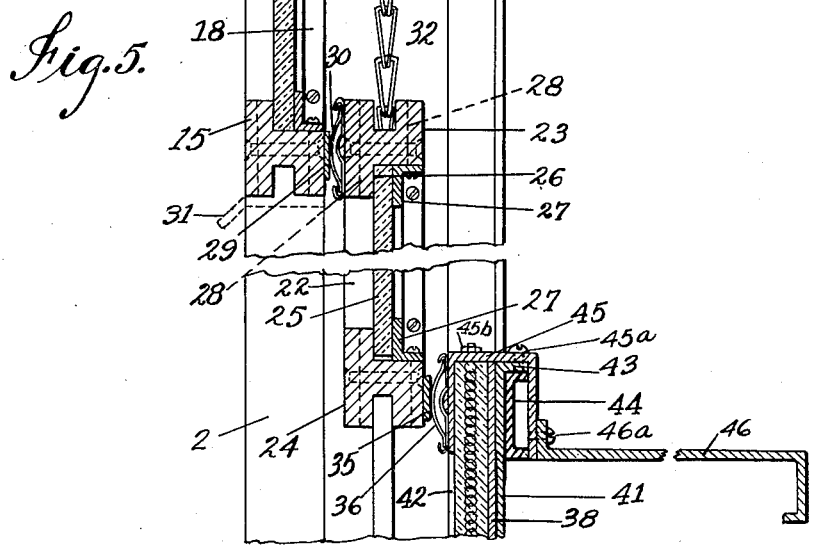
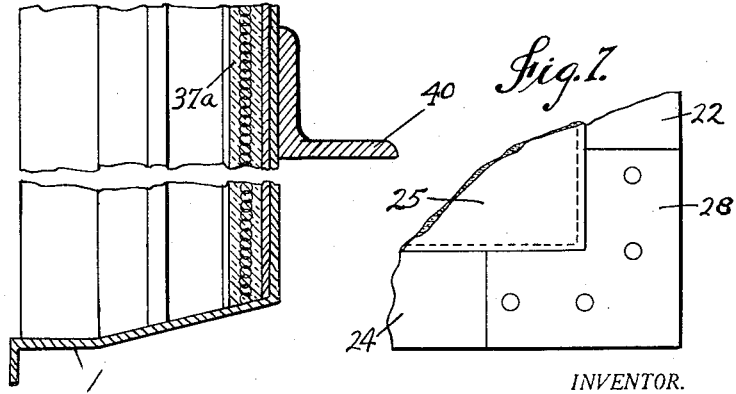
INVENTOR.
BY
ATTORNEY.

Feb. 16, 1932.  E. H. LUNKEN  1,845,304
WINDOW CONSTRUCTION
Filed Sept. 9, 1929    6 Sheets-Sheet 4
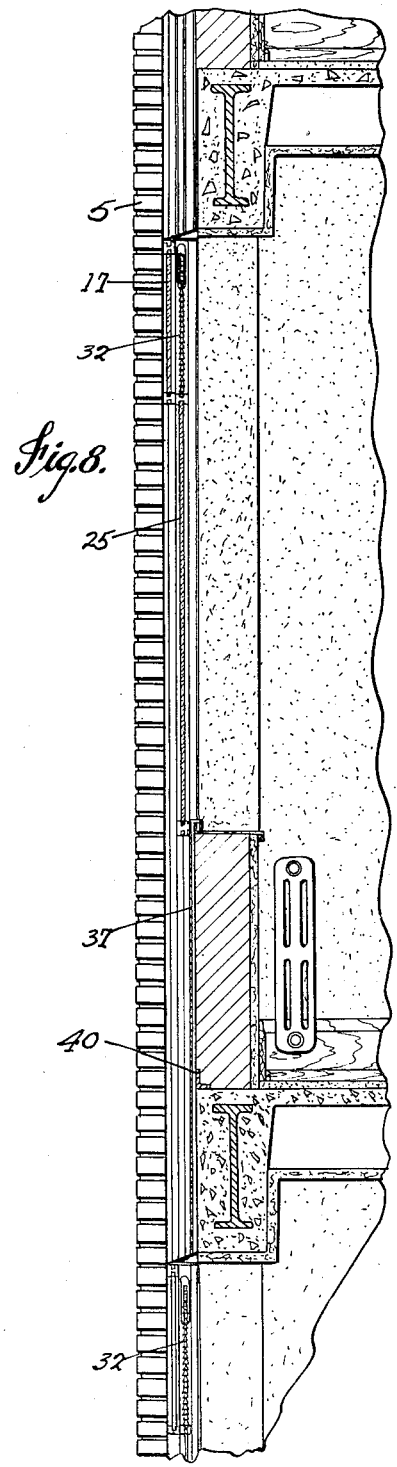
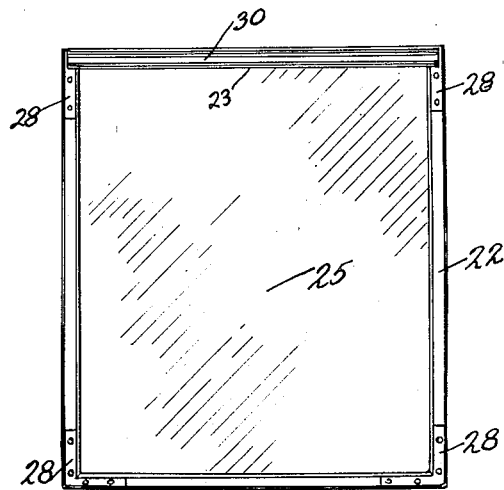
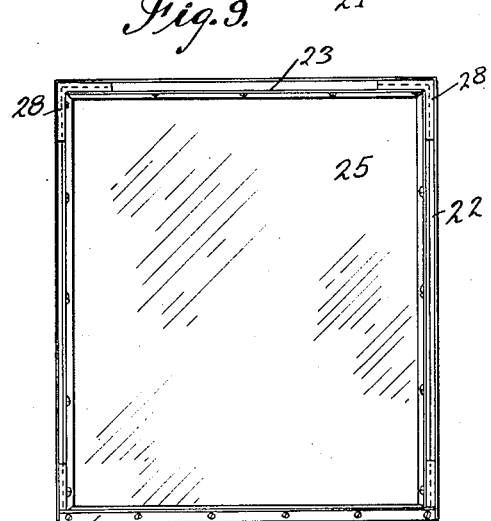
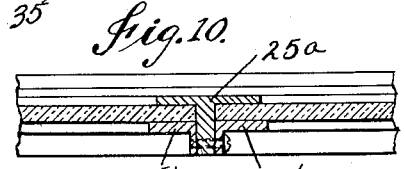
INVENTOR.
Edmund H. Lunken
BY
ATTORNEY.

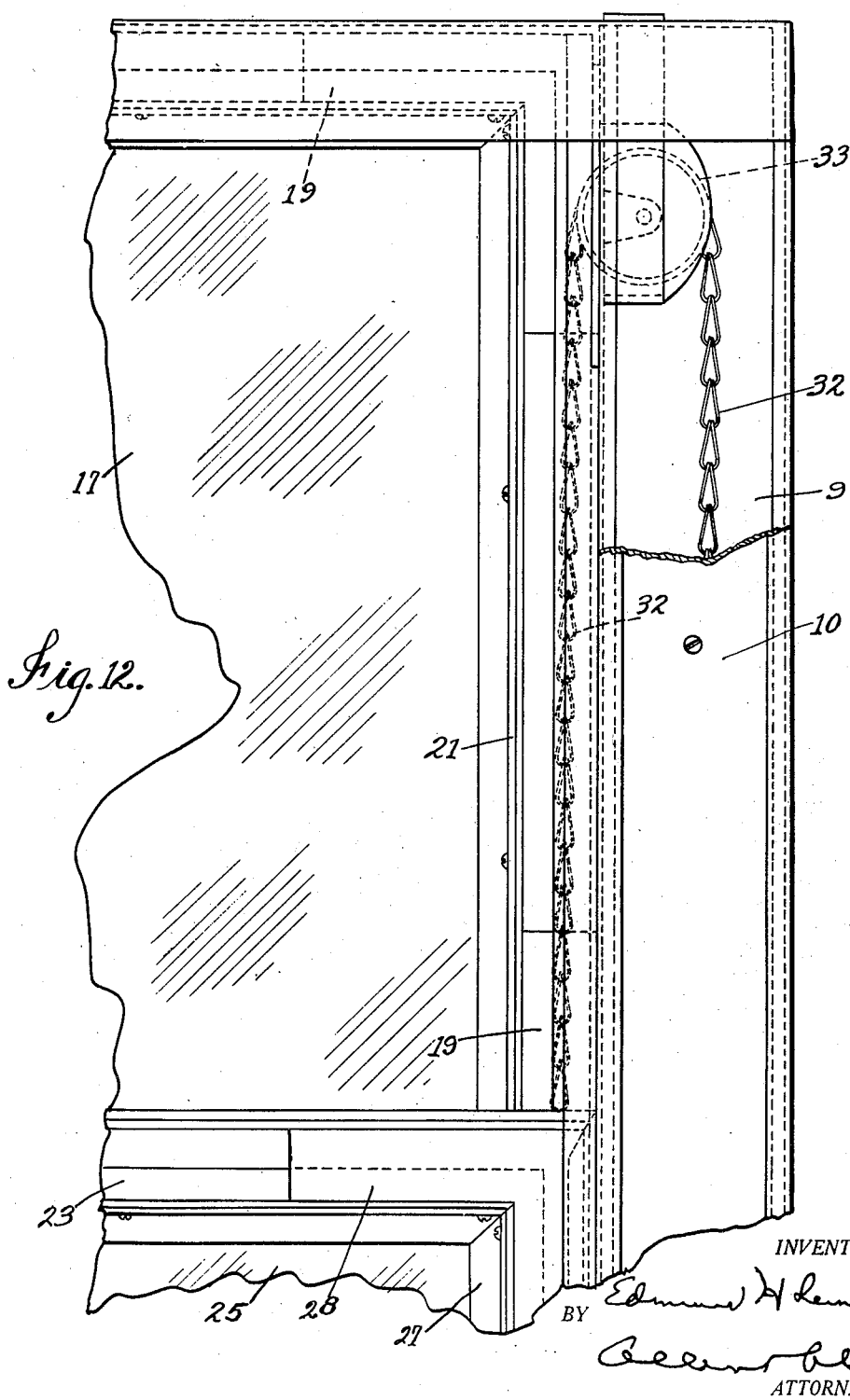

Feb. 16, 1932.　　　E. H. LUNKEN　　　1,845,304

WINDOW CONSTRUCTION

Filed Sept. 9, 1929　　　6 Sheets-Sheet 6

INVENTOR.
Edmund N. Lunken
BY
Allen o. Beeler
ATTORNEY.

Patented Feb. 16, 1932

1,845,304

UNITED STATES PATENT OFFICE

EDMUND H. LUNKEN, OF HARTSDALE, NEW YORK

WINDOW CONSTRUCTION

Application filed September 9, 1929. Serial No. 391,459.

My invention relates to the building art and particularly to improvements in window construction.

In my Patent No. 1,605,598 I have disclosed a window comprising a frame having the lower portion filled by a weather excluding panel member, and the upper portion filled with a transom with a sliding sash arranged to move into closed position extending between the panel and transom, and with the sliding window mounted outside the plane of the panel and inside the plane of the transom. It is to this general type of window that my present invention is directed.

In the newer office buildings, hotels, etc. in many of our large cities, the latest trend of architectural development is toward pilaster construction in which the windows are arranged in a continuous line or shaft, and between each line or shaft of windows there is a pilaster of masonry projecting beyond the window line. My window preferably extends from the lower end of the marginal beam of one floor to the lower end of the marginal beam of the floor above, and preferably has the transom, sliding sash, and panel in close parallel planes unbroken by masonry. While my present invention will also be adapted for residential structures, it is in office and apartment building construction that it will have its most extensive development. It is my object to provide a window construction which will be strong and durable, of pleasing appearance, inexpensive to make and to install, and simple in operation, with a maximum allowance of light and air space. To this end it is one of my objects to provide a frame structure which extends from the lower surface of the ceiling beam of one floor to the lower edge of the beam supporting the floor below. Thus the frames will form substantially a continuous line down the window opening space in the building, and may be installed with a minimum of engineering alterations. This permits a much larger sliding window than has heretofore been made, and one which may be lowered to expose the entire opening between the transom and panel, although various heights of windows and panels may be employed.

In the particular modification described herein, it is my object to employ weight boxes and weights to counter balance the weight of the sliding windows, and in connection with the particular type of weight boxes used, it is my object to form the boxes from practically one sheet of metal with an open side which has a cover on the inside, thus exposing the box for inspection and repair from the inside, and also forming a weather proof exposure portion.

In the construction of the sliding sash it is my object to cut the bars to proper length, mitre the corners, mill the recesses for the corner angles, and then rivet across between the guide and glass grooves, thus providing a frame with a groove extending entirely around the four edges of the frame so that the stiffening bars on the horizontal rails may be readily installed.

Another object is to provide a construction in which the sliding sash is guided without stop strips on both sides of the sash, and in which the guide strip forms a weather strip which is exceedingly simple to manufacture, and readily removable and accessible.

An important feature of the sash construction is the solid bar arrangement with a groove on one side and the glass receiving space immediately opposite, so that after the glazing strip is screwed on there are two grooves. The flush corner angles are riveted through the web between the grooves forming a very rigid sash frame assembly.

Another of my objects is the provision in certain modifications of my window for a stiffening strip for the horizontal bars of the sash or transom which may be quickly attached and which also acts as a weather resisting baffle.

It is another one of my objects to provide a sliding window which can be washed by lowering the sash to the sill level, and then reaching out with a wiper attached to an extension stick without it becoming necessary for the window washer to climb out on the sill. There being no sill, the weathering, due to the accumulation of snow and dirt, is avoided.

I propose to construct the entire frame of a strong, light weight non-corrosive metal.

While I may employ a metal or asbestos board panel in my preferred modification, a translucent panel, such as wire glass, may be employed with a backing on the inner side of colored composition, paper, linoleum or the like, which gives an artistic appearance from the outer side of the building.

Furthermore, in my preferred construction arrangements are made for changing the panels, thus permitting a change in the appearance of the building consistent with any desired plan of redecoration.

The above and other objects to which reference will be made in the ensuing disclosure I accomplish by that certain combination and arrangement of parts of which I have shown a preferred modification.

Referring to the drawings:

Figure 5 is a vertical sectional view of the entire assembly taken along the lines 5—5 in Figure 1 with a modified type of decorative panel.

Figure 6 is a sectional detail of the stiffening strip.

Figure 7 is a detail view of a corner of the sliding sash.

Figure 8 is a sectional view showing a frame set in a wall.

Figure 9 is an exterior view of the sliding sash.

Figure 10 is an interior view of the sash shown in Figure 9.

Figure 11 is a sectional view of the sash showing the muntin.

Figure 12 is an interior elevation of a portion of the top of the frame showing the weight box assembly.

Figure 1:
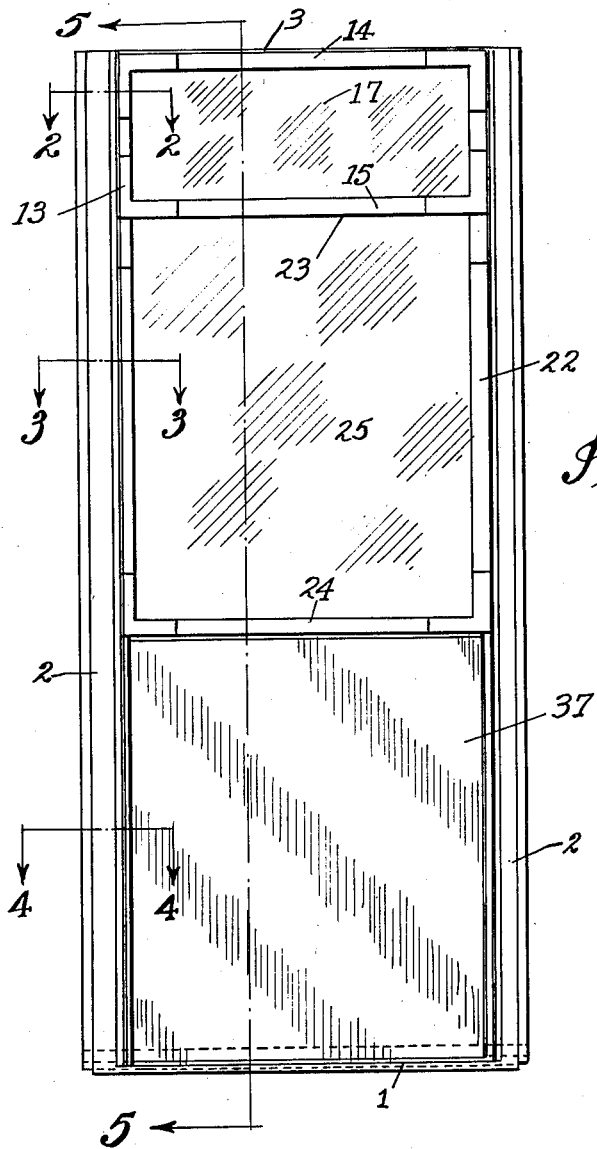
Figure 1 is a front elevation of my preferred construction.
Figure 2:
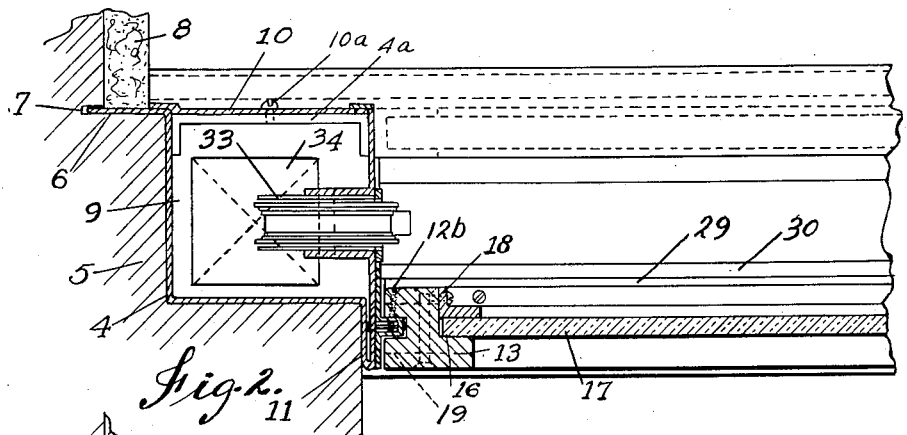
Figure 2 is a sectional view of the frame and transom taken along the lines 2—2 in Figure 1.
Figure 3:
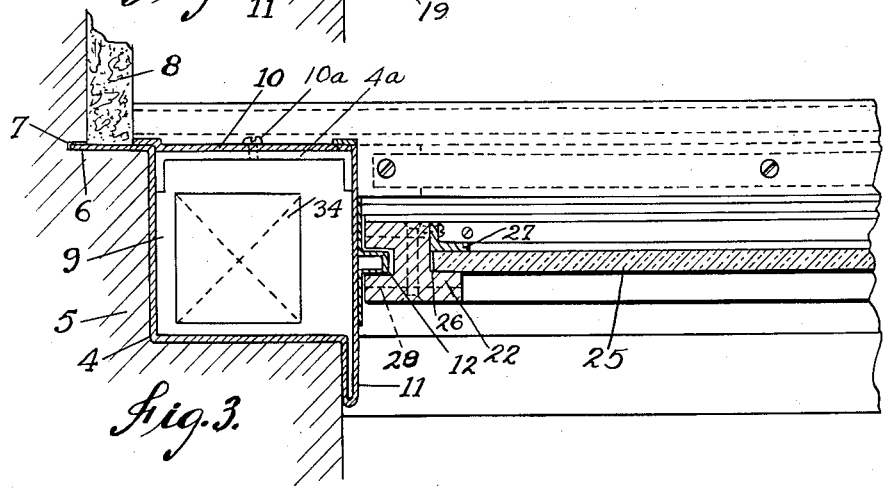
Figure 3 is a sectional view of the frame and sash taken along the lines 3—3 in Figure 1.
Figure 4:
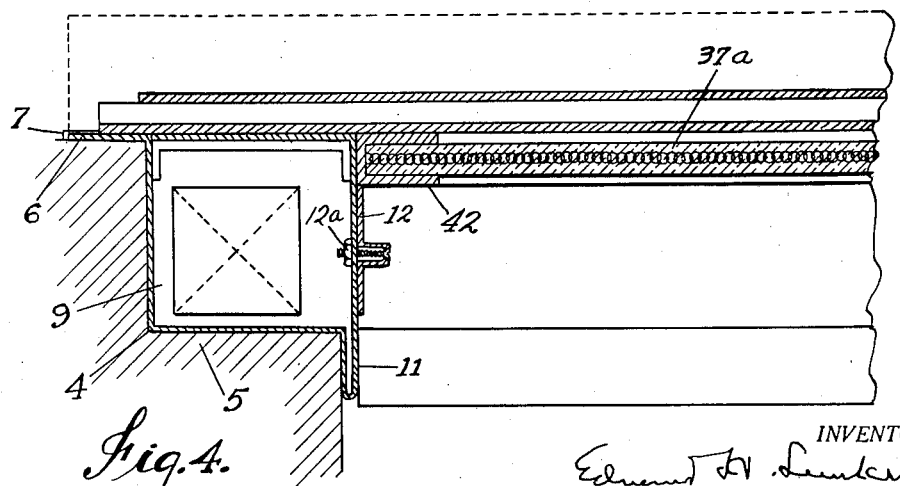
Figure 4 is a sectional view of the frame and panel taken along the lines 4—4 in Figure 1.

The metal window frame has side members 2, a top member 3, and a bottom member 1. As shown in the sectional views in Figures 2 to 4 the side members are composed of angle pieces 4 having a box shape which fits into the angle of the masonry 5. A tongue 6 is preferably sealed in a vertical slit 7 in the masonry, and the interior plaster jamb 8 is set in flush with the inner surface of the tongue 6. The weight box 9 has a cover member 10 which is accessible for removal from within the building. There is a return bent portion 11 of the side members which lie flush with the outer edge of the masonry corner. The guiding strip for the sliding window is indicated at 12, and is preferably of channeled construction as shown, and screwed in place at 12a.

I have shown a fixed transom formed of side sash frame members 13, a top sash member 14, and a bottom sash member 15. The inner corner of the sash members are provided with angled portions 16 within which the glass 17 is mounted, being held in place by the glazing strip 18. Suitable reinforcing corner angles 19 are also provided which seat in milled recesses at each corner. The corner angles 19 are seated in the recess and held in position by screws or rivets 20. As noted, the corner angles lie flush with the balance of the transom frame. The transom assembly may be held in the frame by suitable means such as the retaining strip 21, similar to the strip 12, but welded in place and which extends around the side and upper edge of the transom frame and a screw 12b on each side of the frame holds the same in place, the frame being channeled to fit over the said strip.

The sliding sash is composed of side members 22, a top member 23, and a bottom member 24. The glass 25 is held in the angle 26 in the sash members with a glazing strip 27. As in the transom assembly, reinforcing corner braces 28 are mounted in milled recess at the corner of the sash assembly. The sash slides over the guide strip 12. The inner surface of the transom frame has a contact strip 29 on it, which bears against the weather stripping 30 mounted on the outer surface of the upper frame piece 23. When the window is closed a perfect seal is formed. For reinforcing the transom a stiffening strip 31 may be mounted on the lower edge of the transom frame piece 15. The stiffening strips will have a rib fitting within the channel of the transom frame. The same type of stiffening strip may also be provided for both horizontal rails of the sliding sash.

Attached to the top member of the sliding sash on each side a chain 32 is secured. The chains, one on each side, pass over pulleys 33 and extend down into the weight boxes, where they have suitable weights 34 attached to their ends. The use of weights and weight boxes is not in itself novel, but in the removable panel piece 10, which is accessible from within the inside of the building, I have provided a mounting device which is very simple and readily available. Thus the box-like frames 4 are braced along their inner faces by channel brackets 4a, and the panel pieces 10 are secured to the brackets by screws 10a.

The sash is shown in Figures 9 and 10 without a divided glass pane. If the panes in the window are to be divided, the muntins 25a (Figure 11) will be employed, and angle strips 25b screwed thereto to hold the panes in place. The sliding sash has a contact strip 35 which in closed position bears against the weather stripping 36 of the lower panel. The panel may be of desired design and formed of metal, asbestos board, glass or other weather excluding and decorative material.

In the modified form of panel which I have suggested in Figure 5, I provide a sheet of some such translucent material as wire glass in a sheet 37a inserted from the top into the channels on opposite sides of the frame. In the same or separate channel, I insert some decorative medium which will be visible through the wire glass. Thus I may provide a sheet 38 of paper or fibre board, linoleum, or other decorative background piece, which from the mounting arrangement will be supported in such position that there will be no exposure of the background piece to the weather. It will be apparent that instead of any other decoration, it will be readily practical to insert behind the transparent type of panel, advertising matter such as the name of the occupant of an office, or individual letters which across the building will spell the name, or trademarks or other indicia having publicity value, or identifying the occupant of the building or the building itself. Secured to the frame of the window at the level for the floor construction, is an angle bar 40 which rests on the frame of the floor or floor beams and supports the window during construction, as well as assisting to support it afterward. A sheet of metal 41 is preferably secured across the frame inside of the angle bar, this sheet serving to back up the panel. Secured to the side frame portion for the height of the panel are channel bars 42, which engage the panel and hold it in place laterally.

The top edge of the sheet 41 is bent to a flange 43 to form a stool support, and extending across the sheet below the flange is a channel bar 44. In order to provide an inside sill, I employ a deep inverted channel piece 45 which fits over the upper ends of the guide channels and over the top flange of the backing sheet. This sill cap 45 is screwed down at 45a to the sheet flange and also is preferably bolted at 45b to the top of whatever panel is employed.

The stool plate 46 is screwed to the sill cap, as indicated at 46a. The construction thus permits the sill cap to be removed from the stool, thus enabling the removal and replacement of the panel or of the decorative sheet 38 for the panel.

Figure 12A:
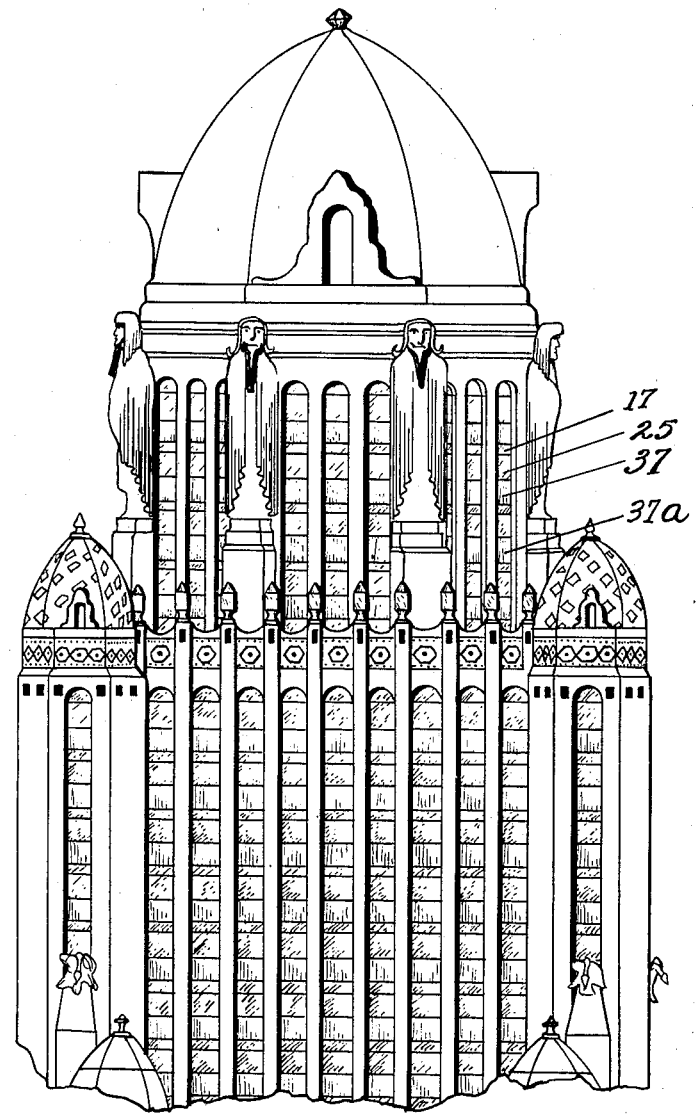
Figure 12a is a detail perspective of a building equipped with my novel window construction.

To operate the sliding sash, the person desiring to do so, merely pushes down on the sash, and due to the fact that the panel extends below the floor surfaces, much larger space may be occupied by the sliding sash than would otherwise be possible. In considering the appearance of a building, such as I have illustrated in Figure 12a, it will be observed that the transoms of each tier of windows are indicated as at 17. The sliding sash appears as shown at 25, and the decorative panels appear as shown at 37 or 37a. there is an uninterrupted tier of window frames extending through the longitudinal space in the building provided for windows and the sliding sash is of considerable length and breadth, thereby permitting very excellent lighting facilities. The decorative panels with the background of desired color or design, offer wide ranges of artistic effects in keeping with the particular architectural scheme which the architect is seeking to effect. It will be understood that angle irons or a similar support may be inserted between the several frames of a tier without departing from the invention.

While I have shown in my preferred construction a transom in connection with the operation of the sliding sash, it is evident that the transom could be omitted and the sash lengthened to cover the entire window opening, and I do not wish to be strictly confined to the use of said transom.

It will be noted that the several window frames are located outside of the framework and floor beams of the building and are secured to the outside of the building framework. This arrangement makes it possible to dispense with the inside portion of the curtain walls and thereby increase the usable floor space in the building.

Having thus described my invention, what I claim as new and desire to secure by Letters Patent, is:—

1. A window construction comprising in combination with a building, a frame extending from the ceiling level of one floor to below the floor level of said floor, a panel mounted in said frame extending across the floor line of said floor, and a window sash mounted in said frame and adapted to slide outside said panel.

2. A window construction comprising in combination with a building, a series of frames extending in vertical alignment, each extending from the ceiling of one floor to below the floor level of said respective floor, and said frames mounted each in contact with another.

3. A window construction comprising in combination with a building, a series of frames extending in vertical alignment, each extending from the ceiling of one floor to below the floor level of said respective floor, and said frames mounted each in contact with another, each of said frames having upper transoms, intermediate sliding sash and lower panels, each of said sash and panels respectively lying inside the plane of that transom or sash above it.

4. A window construction comprising in combination with a building, a series of frames extending in vertical alignment, each extending from the ceiling of one floor to below the floor level of said respective floor, and said frames mounted each in contact with another, each of said frames having upper transoms, intermediate sliding sash and lower panels, each of said sash and panels respectively lying inside the plane of that transom or sash above it, and the panels in said frames extending across the floor lines of the respective floors in the window opening of which they are mounted.

5. A window construction comprising in combination with a building, a series of frames extending in vertical alignment, each extending from the ceiling of one floor to below the floor level of said respective floor, and said frames mounted each in contact with another, each of said frames having upper transoms, intermediate sliding sash and lower panels, each of said sash and panels respectively lying inside the plane of that transom or sash above it, and means for providing a decorative background for said panels.

6. A window construction comprising in combination with a frame, a transom, means for retaining said transom in said frame, a window sash slidably mounted in said frame, and a panel (also mounted in said frame), the transom, sliding sash and panel forming a closure for the entire area of said frame, and said frame extending from the ceiling of one floor substantially to the ceiling of the floor below.

7. A window unit comprising a supporting frame, and a sliding sash mounted within said frame, said sash comprising side and end pieces secured together, with a channel extending continuously around the outer peripheries of said pieces, and a continuous angle groove extending around the internal peripheries of said pieces having glazing strips for retaining a panel in said internal grooves and means for reenforcing an end piece of said sash comprising a stiffening strip having a rib for seating within the channel of said end piece.

8. A window unit comprising a supporting frame, a transom member, a sliding sash member, and a panel member mounted in said frame, said transom, sash and panels each having side and end supporting pieces with channels extending around the outer peripheries thereof, said pieces having continuous internal grooves with glazing strips for retaining glass panels therein, and means for reinforcing the lower pieces of at least one of said members comprising a stiffening strip having a rib for seating within the channels in the lower piece of at least one of said members.

9. A window unit comprising in combination with a supporting frame and sliding sash, a decorative panel extending across the floor level of the floor of the building in which said supporting frame is mounted, said sash being constructed and arranged to slide outside of the panel.

10. A window unit comprising in combination with a supporting frame and a transom and sliding sash, a decorative panel extending across the flood level of the floor of the building in which said supporting frame is mounted, said decorative panel comprising a transparent outer member with a decorative background piece sealed from exposure to weather on the inner surface of said transparent member.

11. A window construction comprising in combination with a building, a series of frames extending in vertical alignment, each extending from the ceiling of one floor to below the floor level of the floor below, said frames being in a vertical plane with each other and connected without intervening projecting masonry.

12. A window construction comprising in combination with a building, a series of frames extending in vertical alignment, each extending from the ceiling of one floor to below the floor level of the floor below, said frames being in a vertical plane with each other and connected without intervening projecting masonry, and panels in the several frames extending from the lower ends of each frame to the window opening level thereof.

13. A window construction comprising in combination with a building, a series of frames extending in vertical alignment, each extending from the ceiling of one floor to below the floor level of said floor and being mounted substantially in contact with an adjacent frame.

14. A window construction comprising in combination with a building, a series of frames for panels and window sashes positioned in vertical alignment and each extending from the ceiling of one floor to below the floor level of said floor.

15. A window construction comprising in combination with a building, a series of frames for panels and window sashes each being substantially as high as one floor of the building, and the several frames being mounted one above the other to provide substantially a continuous line of frames.

16. A window construction comprising in combination with a building provided with a vertical space for windows and panels, a series of frames each substantially as high as one floor of the building and adapted to receive and hold a panel and a window sash, and the several frames being mounted in said space one above the other.

17. A window construction comprising in combination with a building, a series of frames extending in vertical alignment, each extending from the ceiling of one floor to below the floor level of said floor, and said frames being mounted one above another, each of said frames having an upper transom, an intermediate sliding sash, and a lower panel, the panel lying inside the plane of the transom and sash and extending across the floor line of the floor.

18. A window construction comprising in combination with a building, a series of frames extending in vertical alignment, each extending from the ceiling of one floor to below the floor level of said floor, said frames being positioned one above the other without intervening projecting masonry.

19. A window unit comprising a supporting frame, a transom member, a sliding sash member, and a panel member mounted in said frame, said transom and said sash each having side and end supporting pieces with channels extending around the outer periphery thereof, said pieces having continuous internal grooves with glazing strips for retaining glass panels therein, and means for reenforcing the lower piece of at least one of said members comprising a stiffening strip having a rib for seating within the channel in said lower piece.

20. In combination with the framework and floors of a building, a window construction erected on the exterior of the framework and floors, comprising a series of window frame units each extending substantially from the ceiling of one floor to the ceiling of the floor above, and provided with upper and lower stationary sections and an intermediate sash section closing the space between the stationary sections and adapted to be raised or lowered.

21. In combination with the framework of a building, a window frame extending from the floor beam of one floor to the floor beam of the floor above and secured exteriorly of the framework of the building and supported thereby, whereby the window frame is not dependent upon curtain walls for support and the usable floor space in the building may be increased.

EDMUND H. LUNKEN.